UNITED STATES PATENT OFFICE.

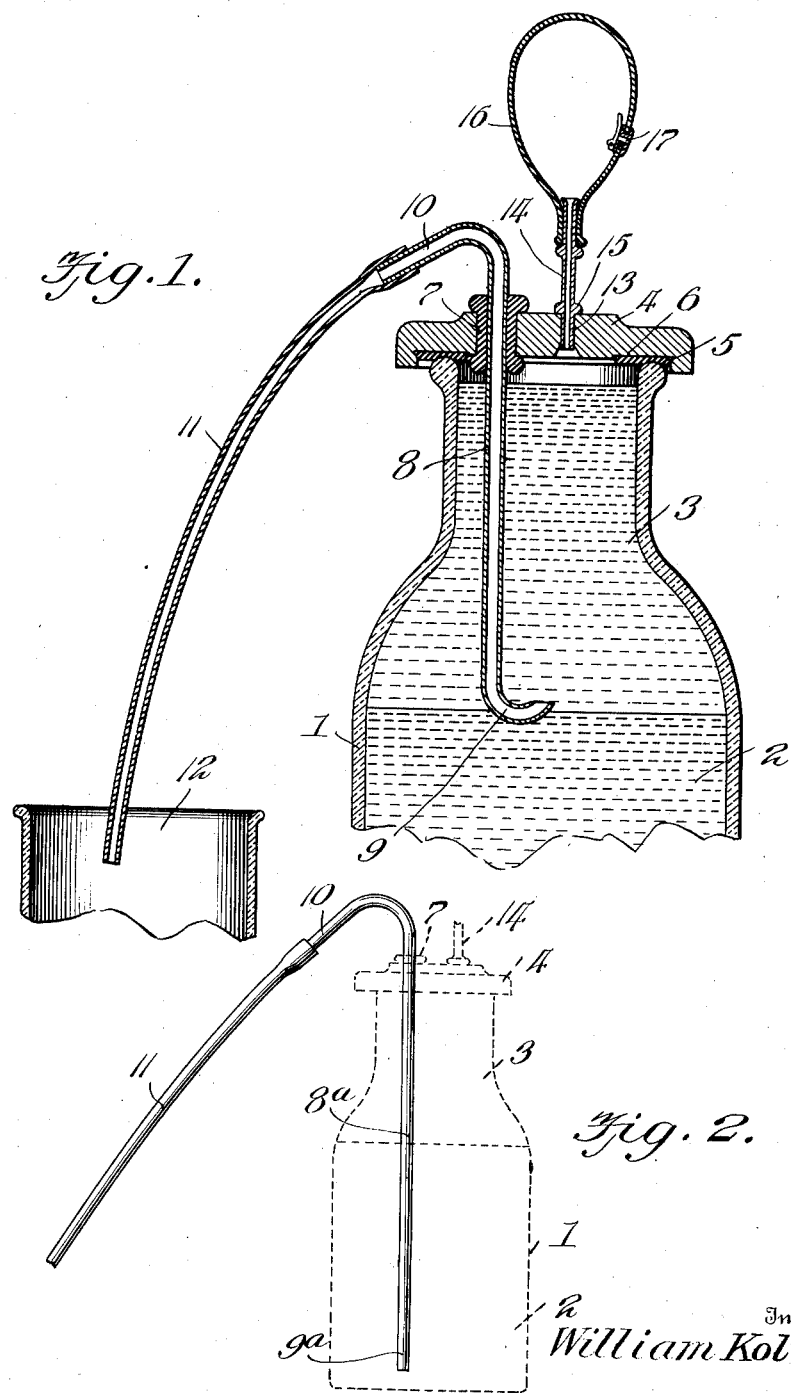

WILLIAM KOLVIG, OF QUINCY, MASSACHUSETTS.

CREAM-SEPARATOR.

No. 927,360.　　　　　Specification of Letters Patent.　　　　Patented July 6, 1909.

Application filed September 15, 1908. Serial No. 453,171.

*To all whom it may concern:*

Be it known that I, WILLIAM KOLVIG, a subject of the King of Denmark, residing at Quincy, in the county of Norfolk and State of Massachusetts, have invented new and useful Improvements in Cream-Separators, of which the following is a specification.

This invention relates to a cream separator for domestic use to separate the cream from the milk contained within an ordinary milk bottle by the withdrawal of one or the other from the bottle, the object of the invention being to provide a siphon extractor of this character which is simple of construction, efficient in use and inexpensive of production, and adapted to be conveniently applied, removed and manipulated.

The invention consists of the features of construction, combination and arrangement of parts hereinafter fully described and claimed, reference being had to the accompanying drawing, in which:—

Figure 1 is a vertical section showing the application of the invention. Fig. 2 is an elevation of a modified form of siphon tube, the bottle and cap or cover being shown in dotted lines.

Referring to the drawing, 1 designates a milk bottle of ordinary construction, 2 a body of milk therein, and 3 the top layer or body of cream which has arisen from the milk.

The object of my invention is to provide a siphon extractor by which either the milk or cream may be withdrawn from the bottle to effect the separation.

The separator embodying my invention comprises a cap or cover 4 of a proper size to fit down upon and close the mouth of the bottle, and composed of wood or some other suitable material. The said cap or cover is of somewhat greater diameter than the bottle mouth and is provided on its underside with an annular sealing disk or washer 5 to fit down upon the rim edge of the bottle mouth and to form an air tight connection therewith. This disk is secured to the underside of the cap or cover in any preferred manner, as by fitting it within a dovetailed recess 6.

Extending vertically through the cap is a guide tube 7, formed of rubber or other suitable elastic material, and extending through this guide tube is a siphon extracting tube or pipe 8. The tube 8 fits snugly within the guide tube 7, which serves as a packing to prevent the entrance of air between said tubes to the bottle when the device is applied for use, the frictional engagement between said tubes being sufficient to maintain the tube 8, which is slidable through the tube 7, in adjusted position. In the form shown in Fig. 1, the tube 8 is provided with an upwardly bent or curved lower end 9 of goose-neck form and an angularly bent or elbow-shaped upper end 10. When the device is applied to a bottle, the extremity of the curved end 9 is arranged to lie slightly above the level of the body of milk 2 and the base of the layer of cream 3, as shown. A conducting tube 11 is fitted at one end upon the upper end 10 of the siphon tube and depends therefrom, its lower end being arranged in use to discharge the extracted cream into a suitable receptacle 12.

The cap or cover 4 is provided with an opening 13 to receive a tubular stem 14 having an annular stop flange 15 to limit its insertion. Upon the upper end of this tube is fitted an air pressure bulb 16 provided with a check valved inlet 17, said valve opening inwardly to admit air into the bulb when the latter expands, and adapted to close when the bulb is contracted to prevent the escape of the confined air and to control the same to flow out through the tube 14.

In the use of the device, the appliance is arranged on the outside of the bottle in order that the tube 8 may be gaged or preliminarily adjusted so that when the device is applied the upturned extremity of its inlet end 9 will lie approximately in line with the bottom line of the body or layer of cream, while the bottom bend of said inlet end will be submerged in the body of milk below. This adjustment is made by sliding the tube 8 through the guide tube 7. The device is then applied to the bottle in the manner shown, the cover being firmly fitted down upon the mouth of the bottle so that the washer 5 will form an air tight connection to prevent the entrance of air into the bottle or discharge of compressed air therefrom, after which the conducting tube 11 is arranged to extend into the receiving vessel 12. The bulb 16 is next operated to force air into the top of the bottle above the layer of cream. The pressure of this air on the body of cream will cause the same to travel up in the siphon tube and out through the bent upper end thereof, the initial portion of the cream passing out through the bend 10 forming a vacuum in the tube, by which the cream is caused to flow outward until exhausted without the necessity of further manipulating the bulb 16. After the cream is wholly withdrawn, the device is removed from the bottle, leaving the body of milk 2 remaining therein. By the use of the goose-necked inlet 10 it will be apparent that the suction pull on the cream at the inlet is in a downward direction, instead of in an upward direction, as is the case in the use of a straight-ended tube, and hence there is no suction pull on the body of milk, as there is in the use of a straight-ended tube. As a result, there is less agitation of the cream at the inlet point and less agitation of the milk, so that the liability of a portion of the milk becoming commingled with a portion of the cream and passing outward therewith through the siphon is lessened.

In the modified form of the invention shown in Fig. 2, the same construction of cap or cover, air pressure bulb and guide tube is employed, but the siphon tube 8ª has a straight lower end 9ª, and is continuously straight throughout its length, which is greater than in the form of tube employed in Fig. 1. The modified form of siphon tube is designed to extend downward through the layer of cream and body of milk to near the bottom of the bottle. When the device is operated in the manner previously described, the milk instead of the cream will be exhausted and discharged into the receptacle 12, the cream being left remaining in the bottle, whereby the separation is effected. In this operation it will be understood that the device is withdrawn as soon as the bottom of the layer of cream touches the bottom of the bottle in order to prevent extraction of the cream, and the receptacle 12 is arranged below the bottom of the bottle for an obvious reason.

It will be seen from the foregoing description that my invention provides a simple and effective construction of separator for domestic use to separate the cream from the milk contained within an ordinary milk bottle by the withdrawal of either the cream or the milk from said bottle, and the construction of the device is such that it may be manufactured and sold at a comparatively low cost, so that it may be within the reach of every householder. Any suitable equivalent of the air pressure bulb may be employed to force air into the bottle.

Having thus fully described the invention, what is claimed as new is:—

1. A cream separator for use in connection with milk jars, comprising a cap or cover, a siphon tube carried by and extending through said cap or cover, said tube having an upwardly bent inlet of goose-neck form, and an air pressure device mounted upon said cap or cover for forcing air therethrough into the jar.

2. A cream separator for use in connection with ordinary milk jars, comprising a cap or cover adapted to close the mouth of the jar, said cap or cover being provided in its underside with a recess, an annular sealing disk fitted in said recess and adapted to bear upon the rim edge of the jar, a guide tube of flexible material extending through the cap or cover, a siphon tube adjustably mounted in said flexible guide tube and frictionally held in adjusted position thereby, and an air pressure device carried by the cap or cover for forcing air into the jar.

In testimony whereof I affix my signature in presence of two witnesses.

WILLIAM KOLVIG.

Witnesses:
JOSEPH CARRUTHERS,
SAMUEL B. CROSBY.